United States Patent [19]

Buntin

[11] 3,972,759

[45] *Aug. 3, 1976

[54] BATTERY SEPARATORS MADE FROM POLYMERIC FIBERS

[75] Inventor: Robert R. Buntin, Baytown, Tex.

[73] Assignee: Exxon Research & Engineering Co., Linden, N.J.

[ * ] Notice: The portion of the term of this patent subsequent to May 21, 1991, has been disclaimed.

[22] Filed: June 11, 1973

[21] Appl. No.: 368,769

Related U.S. Application Data

[63] Continuation-in-part of Ser. No. 267,325, June 29, 1972, Pat. No. 3,811,957, which is a continuation-in-part of Ser. No. 843,839, July 22, 1969, abandoned, which is a continuation-in-part of Ser. No. 787,258, Dec. 26, 1968, abandoned.

[52] U.S. Cl. .............................. 156/167; 156/181; 156/244; 136/146; 136/148
[51] Int. Cl.[2] ..................... D04H 3/16; H01M 2/16
[58] Field of Search ................. 156/167, 181, 244; 264/176 F, 210 F; 136/146, 148; 161/150

[56] References Cited
UNITED STATES PATENTS

| | | | |
|---|---|---|---|
| 2,482,062 | 9/1949 | Hanson | 136/146 |
| 2,965,697 | 12/1960 | Duddy | 136/146 |
| 3,084,091 | 4/1963 | Volkman et al. | 162/103 |
| 3,143,584 | 8/1964 | Roberts et al. | 264/210 |
| 3,216,864 | 11/1965 | Bushrod et al. | 136/148 |
| 3,354,247 | 11/1967 | Zehender et al. | 264/119 |
| 3,502,763 | 3/1970 | Hartman | 264/210 |
| 3,551,943 | 1/1971 | Staton et al. | 18/2 |
| 3,755,527 | 8/1973 | Keller et al. | 8/73 |

OTHER PUBLICATIONS

"Superfine Thermoplastic Fibers," Wente, *Ind. Eng. Chem.*, vol. 18, No. 8, pp. 1342–1346, Aug. 1956.

*Primary Examiner*—Douglas J. Drummond
*Assistant Examiner*—Michael W. Ball
*Attorney, Agent, or Firm*—David A. Roth

[57] ABSTRACT

A battery separator and the process for preparing it, having excellent abrasion resistance, stiffness, porosity, pore size, and electrical resistance is produced by a process that includes degrading a fiber forming polymer, melt-blowing fibers from the degraded polymers and forming a non-woven mat of the fibers randomly laid and self-bonded. The non-woven mat is then compacted, in a critical manner, preferably at temperatures for polypropylene of from 290° to 310°F., using relatively low pressures, i.e. 10 psi/in$^2$ or lss, to obtain a battery separator meeting precise and essential specifications.

3 Claims, 7 Drawing Figures

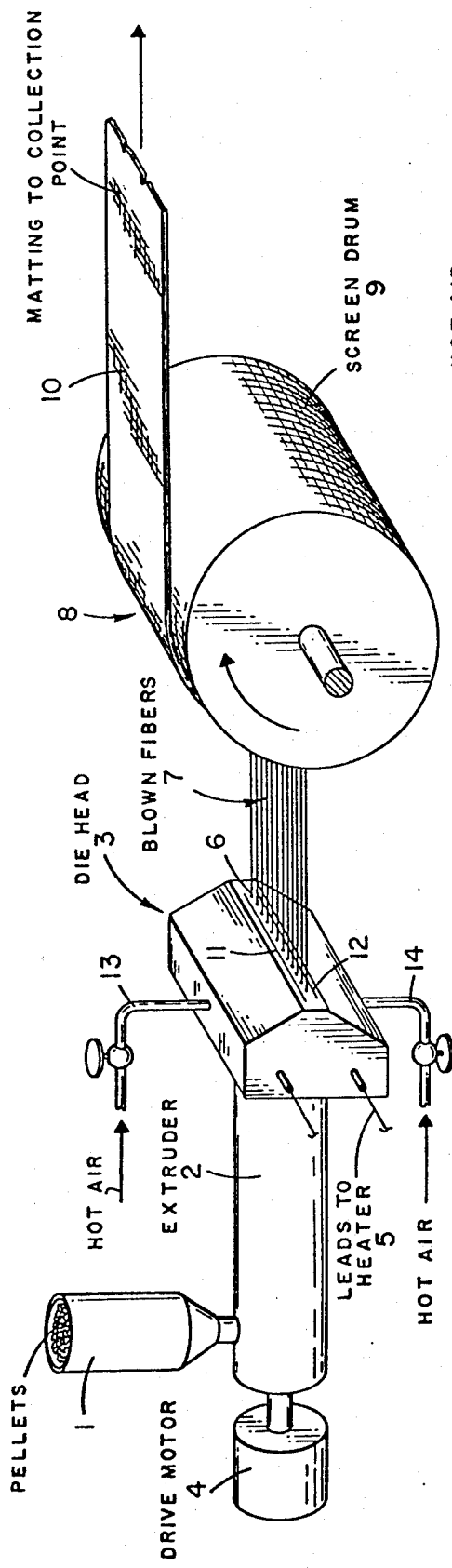
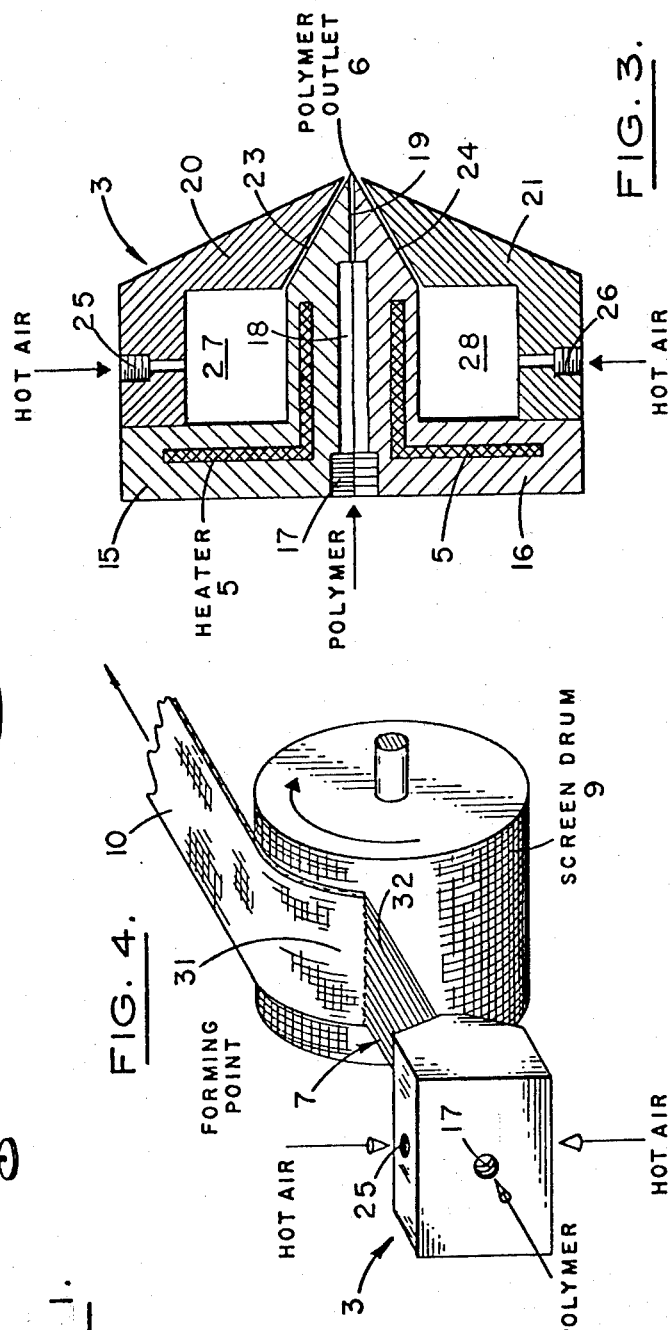

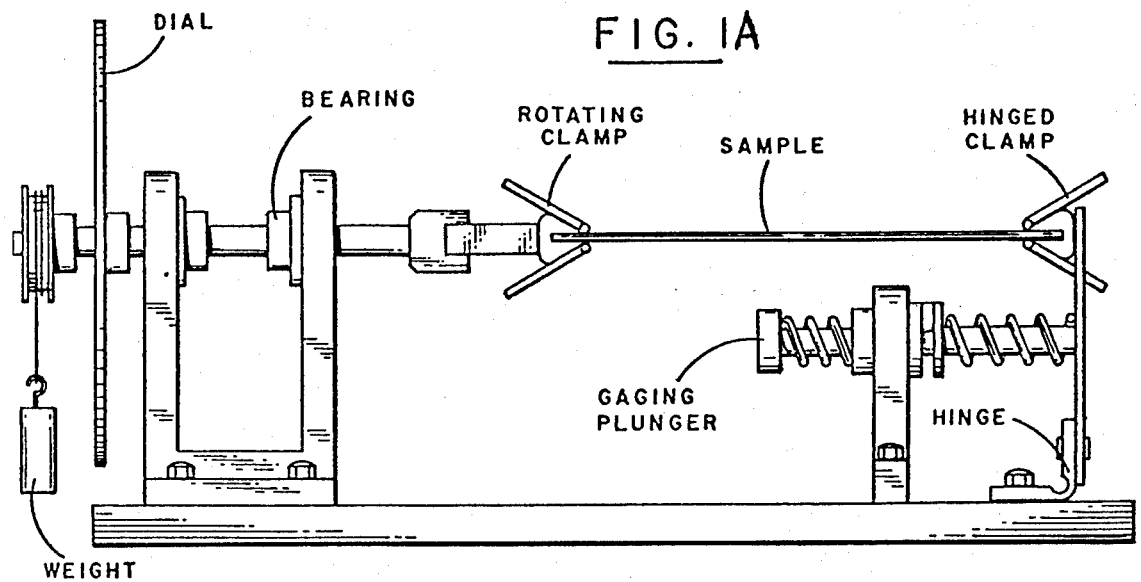
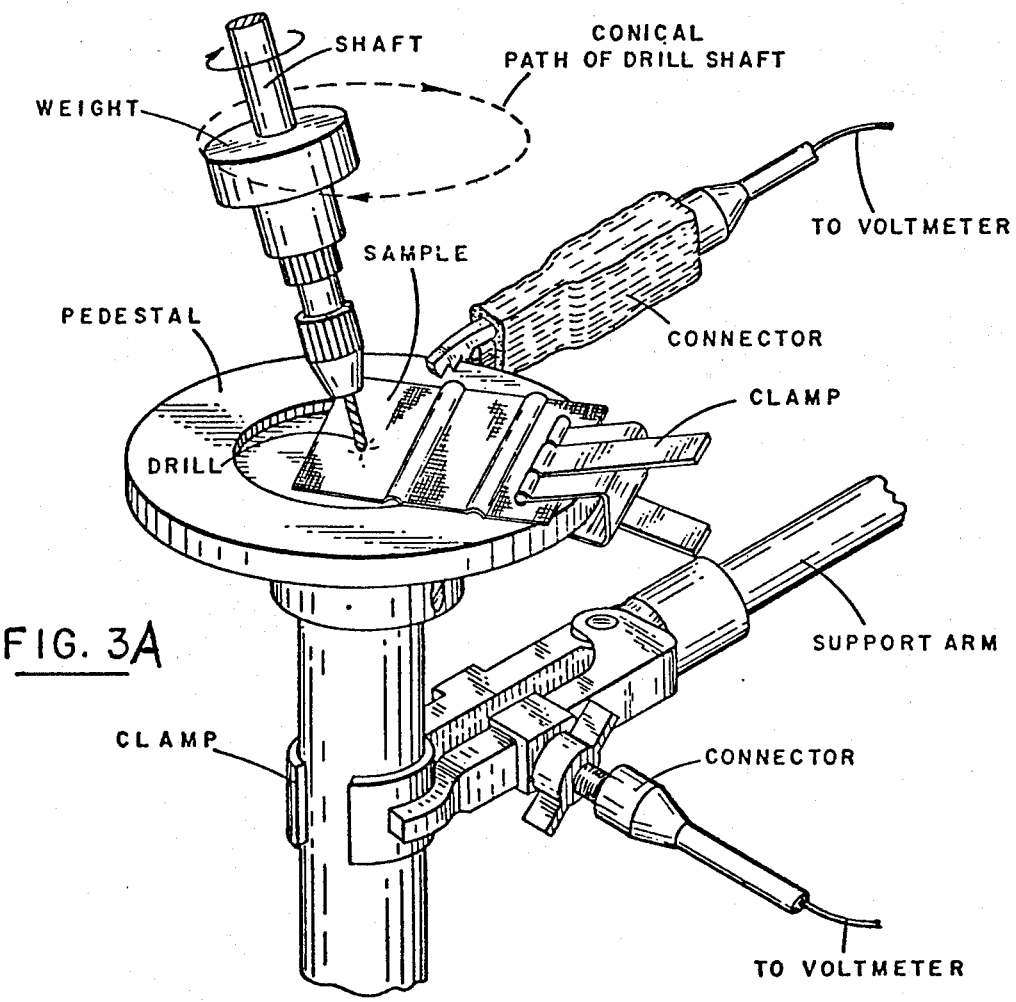

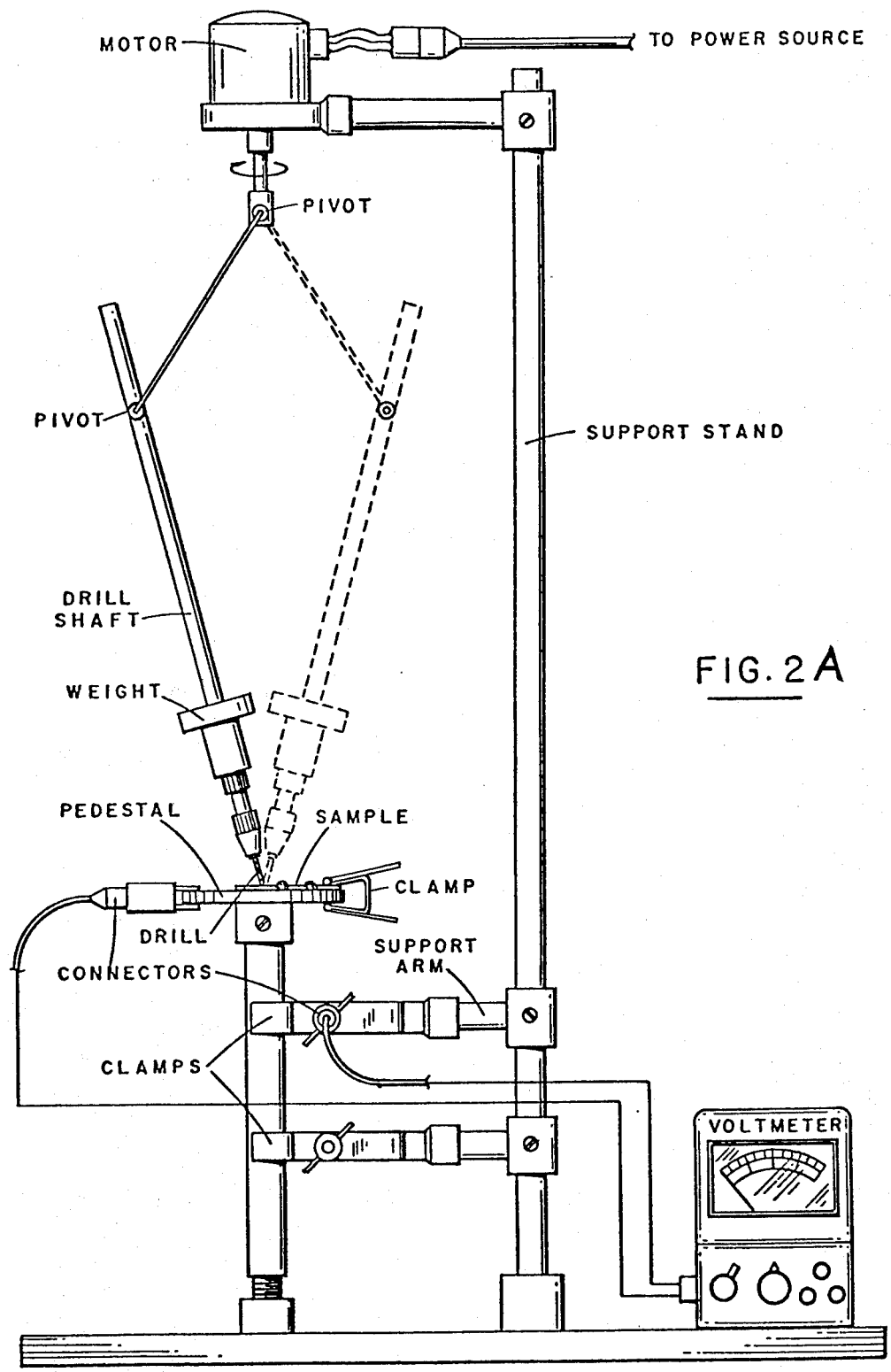

BATTERY SEPARATORS MADE FROM POLYMERIC FIBERS

CROSS-REFERENCES TO RELATED APPLICATIONS

This is a continuation-in-part (C.I.P.) application of Ser. No. 267,325 entitled "Battery Separators Made from Polymeric Fibers", U.S. Pat. No. 3,811,957; which in turn is a C.I.P. of Ser. No. 843,839 filed July 22, 1969, entitled "Battery Separators Made from Polypropylene Fibers", now abandoned which in turn is a C.I.P. of Ser. No. 787,258 filed Dec. 26, 1968, entitled "Battery Separators from Polypropylene", now abandoned; and related applications, but with a different inventive entity, are Ser. No. 227,769 entitled "Non-Woven Mats by Melt Blowing", now U.S. Pat. No. 3,849,241; which is a C.I.P. of Ser. Nos. 865,105 filed Oct. 9, 1969 and entitled "Melt Blow Non-Woven Synthetic Polymer Mat having High Tear Resistance", now U.S. Pat. No. 3,755,527, and 103,050, now abandoned; and 103,094, now abandoned, each filed on Dec. 31, 1970, and entitled "Non-Woven Mats by Melt Blowing", each of Ser. Nos. 103,050 and 103,094 in turn being a continuation-in-part application of Ser. No. 786,122 filed Dec. 23, 1968, entitled "Now-Woven Polypropylene Mat by Melt Blowing", now abandoned.

BACKGROUND OF THE INVENTION

1. Field of the Invention

The present invention is directed to rigid, tough, fine-fibered non-woven polymeric, particularly polypropylene or polystyrene battery separators, and methods for producing them. These have been critically constructed to have the proper characteristics of porosity, stiffness, abrasion resistance, etc.

The invention involves a special melt-blowing process in which a fiber-forming polymer is extruded in molten form from orifices of a heated nozzle into a stream of hot gas to attenuate the molten resin as fibers which form a fiber stream, the fibers being collected on a receiver in the path of the fiber stream to form the non-woven mat which is formed into the battery separator of this invention.

2. Prior Art

Various melt-blowing processes have been described heretofore, earlier efforts including those of Hall (U.S. Pat. No. 2,374,540), Manning (U.S. Pat. Nos. 2,411,659; 2,411,660; and 2,437,263) and Marshall (U.S. Pat. No. 2,508,462). A melt-blowing process is disclosed in the article "Super-Fine Thermoplastics", by Van. A. Wente, in *Industrial and Engineering Chemistry*, Volume 48, No. 8 (1956), pages 1342–1346 and also in Naval Research Laboratory Report No. 111437, submitted Apr. 15, 1954, entitled "Manufacture of Super-Fine Organic Fibers". The Naval Research Laboratory process is further described in NRL Report 5265, dated Feb. 11, 1959, and entitled "An Improved Device for the Formation of Super-Fine, Thermoplastic Fibers". U.S. Pat. No. 3,532,800 to Wyly et al. discloses a use of the Naval Research Laboratory melt-blowing process. A melt spinning and blowing process is disclosed in British Pat. No. 1,055,187 and U.S. Pat. Nos. 3,379,811 and 3,502,763. As evidenced by these prior melt-blowing processes, it has been believed and taught that degradation of a fiber-forming thermoplastic polymer resin is to be avoided in a melt-blowing process.

Heretofore, non-woven mats made of essentially discontinuous fibers and produced by known melt-blowing processes have contained undesirable coarse "shot" or "beads" of material larger than about 0.3 millimeter in diameter. Moreover, prior melt-blowing processes operate at low and generally uneconomical resin flow rates of less than 1.0 gram per minute per resin outlet and experience difficulty in producing soft, fine, high quality mats that do not contain coarse shot. Also, earlier melt-blowing processes do not disclose how to produce mats substantially free of coarse shot from a fiber-forming thermoplastic polymer resin having a high intrinsic viscosity (1.4 or greater), particularly with $C_3$–$C_8$ polyolefins, especially polypropylene. These polyolefins, which are conventionally produced in the presence of a heterogeneous solid catalyst, normally have very high intrinsic viscosities typically 2.2 to 4 and higher, corresponding to high viscosity average molecular weights of about 270,000 to about 550,000 and higher. Intrinsic viscosities as used herein are measured in decalin at 135°C. The melt flow rates or melt indexes of these high intrinsic viscosity resins are quite low, typically about 5 to 0.5 and lower.

The commercially used battery separators are mainly of two types: (1) resin impregnated paper and (2) microporous rubber. The most commonly used material in auto batteries is resin impregnated paper. But, this material is rather brittle and is more susceptible to acid deterioration than is desirable.

The microporous rubber separators are also more brittle than is desired and are much more costly than the resin impregnated paper. The microporous rubber separators are used mostly in industrial battery applications.

It has been long recognized by the industry that battery separators made from polyolefins would possess the property of acid and alkaline resistance. But in spite of numerous and elaborate attempts, polyolefin battery separators possessing other essential properties such as stiffness, abrasion resistance, proper porosity, etc., have eluded the art. Examples of battery separators made from polyolefins, specifically polypropylene, described in the art are illustrated in the following patents: U.S. Pat. Nos. 3,002,040; 3,026,366; 3,045,058; 3,055,966; 3,092,438; 3,314,821; 3,351,495.

A particularly pertinent patent is U.S. Pat. No. 2,482,062. This teaches the preparation of battery separators from polystyrene fibers and other thermoplastics such as polyethylene having very small fiber sizes, i.e. diameters less than 5 microns with a degree of compaction between 30 and 60 percent. This patent recognizes the significance of small fiber size as one of the components determining proper porosity. Nevertheless, the battery separator of the present application is a decided improvement over the battery separator of the '062 patent because it embodies all of the necessary attributes for a commercial fibrous polymeric battery separator, not just small fiber size.

Although Wente shows a process for making mats of super-fine thermoplastic fibers, he has no concept of this invention which provides a battery separator possessing the controlling criteria of proper porosity, proper stiffness, proper abrasion resistance, etc.

SUMMARY OF THE INVENTION

Battery separators comprised of inert acid and base-resistant fiber forming polymers, particularly polypropylene and/or polystyrene in fine fiber form, possessing the controlling factors of proper porosity, proper stiffness, proper electrical resistance, proper abrasion resistance, etc., are prepared according to the melt-blown process of this invention which involves degradation of the polymer. The fibers of degraded polymers are formed into mats which are compacted in a precisely controlled manner at relatively low pressures, i.e. less than 10 psi, and within a highly critical temperature range, i.e. 280° to 320°F., preferably 290° to 310°F. for polypropylene. An optional but preferred feature is the inclusion of a fused, embossed or extruded rib structure on these battery separator structures. They can also be made rewettable by using described techniques.

The fibers that form the battery separator are produced at unusually high polymer throughput rates with no adverse effects on mat quality, for example, without having coarse shot greater than 0.3 millimeter in diameter in the mat, by an outstandingly improved melt-blowing procedure. This improved procedure involves controlling within critical ranges the interrelationships of the parameters of polymer resin flow rate, polymer apparent viscosity, process temperatures, and gas flow rates. Polypropylene is a preferred polymer.

DESCRIPTION OF THE INVENTION

The present invention is an improvement in melt-blowing processes for producing non-woven mats in which a fiber-forming thermoplastic polymer resin is extruded in molten form through orifices of a heated nozzle into a stream of hot inert gas to attenuate the molten resin as fibers which are then collected on a receiver to form the non-woven mat.

It has been discovered that the production of high quality non-woven mats of thermoplastic polymer fibers required a prior degradation of the fiber-forming thermoplastic polymer resin so that the degraded resin, during extrusion through the resin orifices in the nozzle of the melt-blowing apparatus, has an apparent viscosity of from about 50 to about 300 poise, measured at a shear rate of from about 700 to about 3500 sec$^{-1}$.

It has been particularly discovered that fiber-forming thermoplastic polymer resins which, as made, have high intrinsic viscosities (at least about 1.4) and low melt flow rates (at most about 55), can be employed in melt-blowing processes to produce melt-blown non-woven mats of high quality, particularly mon-woven mats which are substantially completely free of coarse shot having a diameter greater than 0.3 millimeter. To use such high intrinsic viscosity, low melt flow rate thermoplastics for this purpose, it is first necessary, before extruding the resin from the nozzle orifices, to subject the thermoplastic polymer resin to a critically controlled degradation, optionally promoted by a free radical source compound, until the thermoplastic polymer resin has both a reduced intrinsic viscosity of from about 0.6 to less than about 1.4, preferably within the range from about 0.8 to about 1.3, advantageously from about 0.9 to about 1.2, and also an apparent viscosity in the nozzle orifices during extrusion of from about 50 to about 300 poise, preferably at least 100 poise, advantageously from about 100 to 200 poise, measured at a shear rate of from about 700 to about 3500 sec$^{-1}$.

This controlled prior degradation of initially high intrinsic viscosity fiber-forming thermoplastic polymer resins permits the production of new melt-blown non-woven mats of high quality which are of two types. One melt-blown non-woven mats is comprised of essentially continuous fibers having diameters in the range from about 8 to about 400, preferably from about 8 to about 50 microns, and is substantially completely free of shot, both coarse and fine. The other type of melt-blown non-woven mat is comprised of discontinuous fibers having diameters in the range from about 0.5 to about 5 microns, preferably from about 0.5 to about 2 microns, and contains only very fine shot, less than 0.3 millimeter in diameter. Both types of these non-woven mats that are substantially completely free of coarse shot have less than about 1 weight percent, preferably less than 0.5 weight percent of shot having diameters larger than 0.3 millimeter. The latter type of mat may contain from about 5 to about 25 weight percent of shot with diameters in the range of about 0.2 to about 0.1 millimeter, less of such shot being acceptable as shot size increases. Preferably shot size is less than 0.1 millimeter. (Shot size refers to shot in the as made form, prior to any calendering or compression thereof which tends to flatten the shot and increase its diameter). The intrinsic viscosity of the fibers in these mats is in the range from about 0.6 to less than about 1.4.

Successful production of these high quality mats involves careful selection of special process conditions and a correlation of the apparent viscosity of the degraded resin with the resin flow rates of the degraded resin and with gas flow rates, which occur both in a low gas flow rate regime of from about 2.5 to about 20 pounds per minute per square inch of gas outlet area and in a high gas flow rate regime of from more than 20 to about 100 pounds per minute per square inch of gas outlet area. The selection and correlation of these special process conditions is described hereinafter in greater detail. It is appropriate first, however, to describe in greater detail the process of degrading the initially high intrinsic viscosity fiber-forming thermoplastic resins employed in the subject process.

There are a few general approaches to bring about the extent of polymer degradation requisite to the practice of this invention. Temperatures well above the melting point of the polymer are employed. In the absence of free radical source compounds, which promote oxidative degradation, the high intrinsic viscosity resin suitably is subjected to a temperature within the range from about 550° to about 900°F., preferably from about 600°F. to about 750°F., for a period of time effective to cause the requisite extent of resin degradation, typically from about 1 to about 10 minutes, preferably from 2 to about 6 minutes. No effort is made to exclude oxygen from the thermal degradation reaction. Accordingly, both thermal and oxidative degradation occur in such temperature ranges, oxidative degradation being predominate at temperatures below about 650°F., and thermal degradation becoming predominate above about 650°F. (The activation energy for autooxidative degradation is reported to be from about 26 to about 33 Kcal/mol; for thermal degradation it is reported to be from about 50 to about 65 Kcal/mol; for a combined thermal and oxidative process, it is calculated to be about 33 Kcal/mol. Thus, at 550°F., the percent of the total degradation reaction attributable to autooxidation is about 90%; at 600°F., it is about 75%, and at 650°F., it is about 55%.) Thus, herein, oxidative degradation will be understood to be occurring, particularly at the lower temperatures in the aforesaid temperature ranges, whenever thermal degradation is mentioned. Lower temperatures of from about 475°F to about 650°F. are suitably employed to bring about degradation when oxidative degradation is promoted by the presence of one or more free radical source compounds.

Suitable free radical source compounds include organic peroxides, thiyl compounds (including thiazoles and thiurames, thiobisphenols and thiophosphites) and organo-tin compounds. Preferred free radical source compounds include t-butylbenzoate, dicumylperoxide, 2,5-dimethyl-2,5-di-tert-butylperoxy-3-hexeme (Lupersol 130), a,a,'-bis (tert-butylperoxy) diisopropyl benzene (Vul Cup R); or any other free radical source compounds having a 10-hour half life temperature over 80°C., or mixtures thereof. In general, the higher the decomposition temperature of the free radical source compound, the better. Reference is made to pp 66–67 of *Modern Plastics*, November 1971, for a more complete list of suitable such compounds. Sulphur compounds which give rise to suitable thiyl compounds are disclosed in U.S. Pat. No. 3,143,584. Suitably such free radical source compounds are used at concentration in the range from about 0.01 to about 5 weight percent, preferably from about 0.1 to about 3 weight percent.

The thermoplastic polymer resin having the high initial intrinsic viscosity of at least 1.4 is preferably thermally and/or oxidatively degraded either in an extruder separate from the melt-blowing apparatus or in an extruder feeding the resin into the nozzle orifices of the melt-blowing apparatus. Alternatively, the requisite extent of degradation may be imparted to the resin by thermal degradation of the resin in the heated nozzle. Preferably, however, the requisite extent of degradation is imparted to the resin at least partially in the extruder feeding the resin into the nozzle orifices.

The degraded fiber-forming thermoplastic polymer resin used in the present melt-blowing process preferably is produced, in one or more degradation treatments, from fiber-forming thermoplastic polymer resins that are degradable to have an apparent viscosity in the nozzle orifices of from about 50 to about 500 poise, including polyamides, e.g., poly(hexamethylene adipamide), poly (w-caproamide) and poly(hexamethylene sebacamide); polyesters, e.g., poly (methymethacrylate) and poly(ethyleneterephthalate); polyvinyls, e.g., polystyrene; $C_3$–$C_8$ polyolefins, high density polyethylene, and mixtures thereof. Preferably the fiber forming thermoplastic polymer, as made, has an intrinsic viscosity of at least about 1.4, most preferably about 2.5 and greater. Supported metal oxide or Ziegler transition metal halide catalyzed olefin polymers, especially the $C_3$–$C_8$ polyolefins having initials minimum intrinsic viscosities of 1.4 and greater, are preferred, particularly fiber-forming polypropylene.

In accordance with this invention, commercially useful resin through-put rates can be utilized. Suitable resin throughput (flow) rates range from nominally about 0.1 (e.g. as low as about 0.07) to about 5 grams per minute per nozzle orifice, preferably at least about 1 gram per minute per orifice.

In the melt-blowing process of the present invention, the degraded fiber-forming thermoplastic polymer resin is attenuated while still molten to fibers having diameters of 0.5 to 400 microns. The diameter of the attenuated fibers will decrease as the gas flow rate through the gas outlets or slots on either side of the nozzle die openings increase. Gas rates may vary from 2.5 to 100 pounds per minute per square inch of gas outlet area, or greater. At low to moderate gas rates of from about 2.5 to about 20 pounds per minute per square inch of gas outlet area for resin flow rates of from about 0.1 to about 5 grams per minute per orifice, the fibers are essentially continuous with little or no fiber breaks. Fibers produced in this low to moderate gas flow rate regime have diameters of from about 8 to about 200–400 microns, preferably from about 8 to about 50 microns.

As gas rates increase for a selected resin flow rate of a degraded resin, the number of fiber breaks increase, producing coarse "shot", which is large globs of polymer having a diameter at least several times that of the average diameter size of the fibers in the mat and at least 0.3 millimeter in diameter. The production of coarse shot is objectionable in the mat when a uniform mat is desired. Further, if the mat is calendered or further treated, the coarse shot will produce imperfections in the surface or even holes.

At high gas rates of from about more than 20 to about 100 pounds per minutes per square inch of gas outlet area, the mats are composed of non-continuous polymer fibers with the presence of a fine shot less than 0.3 millimeter, preferably 0.1 millimeter in diameter, which is not objectionable in the mat. At the high air rates for resin flow rates in the range from about 0.1 to about 5 grams per minute per orifice, mats are produced in which the fiber size is between about 0.5 and 5 microns.

The resin flow rate, gas flow rate and the apparent viscosity of the degraded resin are controlled and correlated, in accordance with the invention, to provide increased production of melt-blown non-woven mats while preventing the inclusion as aforesaid of coarse shot in the mats. These correlations make use of interrelationships which exist between the resin flow rate, gas flow rate and apparent viscosity of the degraded resin in both the high and low gas flow rate regimes. These interrelationships are illustrated in Table I which follows:

TABLE I

Interrelationships of Resin Flow Rate (RFR), Gas Flow Rate (GFR) and Apparent Viscosity (A.V.) of Degraded Resin in High and Low GFR Regimes

| | | | Third Variable | Third Variable Limiting Adjustment: Low GFR Regime | High GFR Regime |
|---|---|---|---|---|---|
| A. Chosen Combination of Two Variables | | | | | |
| 1. RFR, GFR | | | A.V. | Minimum | Maximum |
| 2. RFR, A.V. | | | GFR | Maximum | Minimum |
| 3. GFR, A.V. | | | RFR | Minimum | Maximum |
| B. Fixed | Changed | | | | |
| 1. RFR | GFR | { increase<br>decrease | A.V. | { increase<br>— | { —<br>decrease |
| GFR | RFR | { increase<br>decrease | A.V. | { —<br>increase | { decrease<br>— |

TABLE I-continued
Interrelationships of Resin Flow Rate (RFR), Gas Flow Rate (GFR) and Apparent Viscosity (A.V.) of Degraded Resin in High and Low GFR Regimes

| | | | | | | |
|---|---|---|---|---|---|---|
| 2. | RFR | A.V. | increase | GFR | — | increase |
| | | | decrease | | decrease | — |
| | A.V. | RFR | increase | GFR | — | increase |
| | | | decrease | | decrease | — |
| 3. | GFR | A.V. | increase | RFR | — | decrease |
| | | | decrease | | increase | — |
| | A.V. | GFR | increase | RFR | increase | — |
| | | | decrease | | — | decrease |

Table I shows that there are three basic groupings of the variables. For a particular combination for values for two variables which it is chosen to fix, the third variable has, in the low and high gas flow rate regimes, either a minimum value below which, or a maximum value above which, coarse shot will be formed. Thus, referring to Group 1, where a particular resin flow rate and gas flow rate in the aforementioned range are chosen as the fixed combination of variables, in the low gas flow rate regime, the resin is degraded to have a selected apparent viscosity in said range from 50 to 300 poise that does not exceed a minimum apparent viscosity below which coarse shot is formed. Similarly in Group 1, for the high flow rate regime, the resin is degraded to a selected apparent viscosity in the range from 50 to 300 poise that does not exceed a maximum apparent viscosity above which, for the chosen combination of resin flow rate and gas flow rate, coarse shot is formed.

If it is wished to increase or decrease in the values of one of the variables in the chosen combination, an adjustment may need to be made in the third variable to prevent the formation of coarse shot. For example, in the first case in which resin flow rate and gas flow rate are the chosen combination, if the gas flow rate is increased or the resin flow rate is decreased, the minimum apparent viscosity selected for the degraded resin must be increased in the low gas flow rate regime to prevent the inclusion of coarse shot in the resultant non-woven mat. However, no limiting adjustment is necessary in the apparent viscosity to prevent the inclusion of coarse shot in the mat in the low gas flow rate regime if the gas flow rate is decreased or the polymer rate is increased; in this situation, the result in the low gas flow rate regime will be thicker, coarser fibers. In the high gas flow rate regime, a decrease in the gas flow rate or an increase in the resin flow rate requires a decrease in the maximum apparent viscosity of the degraded resin in order to prevent the inclusion of coarse shot in the non-woven mat. However, no limiting adjustment in apparent viscosity is necessary to prevent the inclusion of large shot in high gas flow rate regime if gas flow rate is increased or resin flow rate is decreased; in this situation the fibers in the non-woven mats generally have smaller diameters.

The foregoing interrelationships will be further understood by the description of the preferred embodiment and modes of the invention taken with the examples.

The most preferred polymer for forming the fibers is polypropylene but other polymers that can be melt blowen and compacted to obtain a non-woven battery structure of compacted fibers meeting the specifications and properties detailed herein are advantageous in specific applications.

The suitable polymers which may be melt blown with particular advantage are usually other acid and base-resistance fiber-forming thermoplastics as illustrated by polystyrene, polymethylmethracrylate and other polyolefins such as polyethylene, polybutene, polymethylpentene or ethylene-propylene copolymers. Nylons and polyesters are especially suitable for alkaline battery separators. Mixtures or blends of such polymers also can be used.

To produce a battery separator from the non-woven mat produced by the melt-blowing process, the mat must be compact to obtain the desired thickness and porosity as well as the mechanical properties of strength, abrasion resistance, etc.

The non-woven mat is preferably compacted to a thickness of between 10 and 50 mils to be useful as a battery separator in most batteries. The compacting is preferably carried out by a critically controlled thermal compacting operation utilizing calender rolls or a press and shims or spacers to obtain a non-woven mat of fixed thickness.

The compacting is a highly critical portion of the process and must be carried out quite precisely with great attention to detail in order to produce a battery separator which will possess the essential commercial qualities, especially those of porosity, stiffness, electrical resistance and abrasion resistance.

In short, the compacting is carried out in a manner adequate to satisfy several parameters. Some of these are:

a. the thickness of the resulting structure should be constant,
b. the structure itself is formed or compacted under constant gap conditions, and
c. the pressure applied to the surface of the mat, when it is parallel to the shims or spacers which are used to form the constant gap, must not in general exceed 10 psi, usually being only somewhat over 0 psi, and preferably in the order of 2 to 8 psi.

When compacting is carried out in accordance with these criteria and in conjunction with and in light of the critical temperatures to be described as follows, satisfactory separators of commercial quality can be produced. For such polymers as polypropylene aand polystyrene compaction temperatures of 175°–320°F are preferred and from 185°–310°F are more preferred.

When relatively high temperatures and high compacting pressures are used, products of adequate stiffness and abrasion resistance are produced but they have inadequate porosity.

When low pressures and low temperatures are used, products of good porosity but in adequate stiffness and abrasion resistance are produced.

Both the temperature and the compacting pressures are highly critical interrelated factors. For example, if the temperatures exceed about 320°F in the case of polypropylene, even at low compacting pressures, the article will fuse and requisite porosity will be lost, even though the product will have adequate stiffness and abrasion resistance.

It is only by operating within the specified temperature range and at the specified pressures that a polypropylene battery separator having (1) the proper porosity, (2) the proper stiffness, and (3) the proper abrasion resistance can be produced.

The requirement for stiffness has its genesis in the conventional operations of the battery separator industry. In that industry, equipment and machinery have been designed and used for a good many years with very stiff batterry separators. Therefore, a battery separator, even though it has excellent properties under actual battery conditions and excellent economics in terms of the material cost and fabrication must be sufficiently rigid. Thus, to be acceptable in conventional applications, it must be able to be handled by the existing capital equipment.

A most essential prerequisite of this handling requirement is that the battery separators be stiff. However, it was soon learned that making a stiff thermoplastic fiber battery separator while still retaining the necessary qualities of porosity was an extremely difficult task. A great deal of research and development effort was utilized in order to find the precise set of conditions that would produce a battery separator that would meet all of the prerequisites that are absolutely essential to perform well as a commercial battery separator.

Although stiffness and toughness, i.e. measured herein as abrasion resistance, are factors which have been mentioned above, another important property of a battery separator is that it have good compression resistance, that is, that it not be squeezed out of shape when subjected to high compressive forces. It has been found that the battery separators of this invention prepared utilizing the critical process conditions of compacting and temperature also have good compressive strengths. These compressive resistance properties are amplified considerably when the ribs are of the fused variety described above.

Further, it hs been found that to overcome a problem of glazing or glass-like surface, a material can be utilized between the non-woven mat and the pressing surface. Examples of such materials which can be used as spacers are kraft paper, tissue paper, writing paper, fine cotton cloth, linen, etc., which have a rough surface.

Non-woven mats pressed without such spacer materials tend to adhere to the metal plate surfaces of the press and the surface of the non-woven mat will become slick and film-like.

In lieu of a spacer material, Teflon coated metal pressing surfaces can also be used.

The compacting operation can be carried out preferably in a continuous operation such as by use of calender rolls but also can be carried out in a batch-type pressing operation. In either approach, a compressed non-woven mat of a fixed thickness is desired.

To obtain the fixed thickness, a shim or spacer should be used between the pressing plates or calender rolls, with the required pressure to obtain a predetermined, fixed thickness.

For production of battery separators on a large scale, calendering will probably be a more economic mode than static pressing.

Calendering involves passing continuous sheets of a non-woven mat between two rolls.

Since the mat material is exposed to the compaction of the rolls for a relatively brief space of time, it is necessary to preheat the material so that it is at the proper critical temperature as it passes through the rolls. The rolls themselves are also heated. Otherwise the residence time in the rolls is insufficient to adequately heat the mats to the critical temperatures.

The rolls are spaced or gapped appropriately so as to conform to the critical pressure ranges detailed elsewhere herein.

When the embossing is carried out in such a manner that the pressures at a particular point forming the ribs are very high, the thermoplastic material will fuse into a hard molded rib. This is highly preferable, since it not only adds to the stiffness of the overall battery separator, but it enables exceptional performance under actual battery conditions, where the ribs must touch the battery plates and not be susceptible to abrasion and compression from these plates.

In producing a battery separator, if fused ribs are not needed, an embossed pattern or rib can be pressed into the non-woven polypropylene structure to obtain battery separators with a desired design configuration. The embossing or the forming of ribs is preferably carried out at the same time the non-woven polymer mat is pressed to the fixed thickness in the compacting operation.

Suitable techniques for incorporating ribs or battery separators are described in Ser. Nos. 149,677, 163,206 and 163,207, which are incorporated herein in their entirety by reference.

The non-woven structures of the present invention are especially useful in the lead-acid batteries of the SLI-type (starting, lighting and ignition) and the industrial type. These batteries have positive electrodes and negative electrodes which are separated by the battery separators.

It hs been found that a non-woven structure having a *basis weight* between 100 and 500 grams/square meter is preferred. A basis weight between 150 to 300 grams/square meter is more preferred for producing battery separators of the SLI-type and polypropylene in the preferred material. The preferred thickness of the original mat is between 40 and 200 mils. The non-woven structure is compacted to a thickness which is preferably between 15 to 35 mils and a porosity preferably of 50% or greater.

The maximum pore size in a non-woven structure of the present invention is generally below 25, i.e. from 5 to 22, preferably 7 to 20, microns in the better quality sheets. The maximum pore size is a measurement of the largest pore or opening in the compacted structure to be used as a battery separator and is measured essentially by the ASTM-D-128-61 test procedure entitled "Maximum Pore Diameter and Permeability of Rigid Porous Filters for Laboratory Use."

The pore size of a battery separator is a very important characteristic. Low pore sizes provide an effective barrier to active material growing through and bridging between opposite plates of the battery, i.e. treeing, and thereby causing shorting.

But in order to achieve low electrical resistance, a high percent porosity is generally required in battery separators. The problem is to reconcile two antagonistic properties. Thus, in general, increasing the percent porosity also increases pore size because the distance between adjacent fibers increases.

As a feature of this invention, it was found that an effective way to decrease pore size and retain an adequate level of porosity is to drastically decrease the fiber size in the non-woven structure.

By forming the same weight of thermoplastic into very small fibers and randomly distributing these fibers, the fiber-to-fiber distance is reduced and thus smaller pores are obtained. The very small fiber sizes, i.e. below 10 $\mu$ utilized in the present invention thus make possible the unique and important combination of low electrical resistance and small pore size in the non-woven structure.

The perception to recognize the connection and relationship between the polyolefin fibers of a melt-blown process (which are extremely small) and the possibility of their use for battery separators is part of the inventive concept. Until now, fibers small enough to provide the requisite high porosity were simply not available by any known process, notwithstanding U.S. Pat. No. 2,482,062.

One of the major achievements of this invention is to provide a polyolefin battery separator which combines all of the requisite, commercial properties of a battery separator. These are; high porosity, small pore size, low electrical resistance, good abrasion resistance, and excellent stiffness.

Thus, to prepre a battery separator with all of these properties is a significant achievement since many of these properties are antagonistic to each other. That is, that if one maximizes one of these important properties, one is liable to minimize one or more of the other important properties. Therefore, every property must be obtained in the light of the effect it has on all the other properties of the battery separators.

Thus, for example, one normally desires a high abrasion resistance in a battery separator. This enables the separator to provide a long service life. But electrical resistance must also be low. These two properties have an inverse linear relationship to each other. Therefore, a compromise must be made between low electrical resistance and high abrasion resistance. This has been successfully achieved in the battery separator of the invention.

Another example is the relationship of maximum pore size with electrical resistance. Thus, generally a compacted web with relatively small values of maximum pore size are the prerequisite for battery separators. But in order to achieve small pore size, one must increase the solid fraction. When one increased the solid fraction, a concomitant result is a rapid increase in electrical resistance. Thus, these antagonistic properties must be balanced off.

Stiffness, i.e. tortional stiffness, is related to the solid fraction, web thickness and the degree of bonding. For any desired solid fraction and web thickness, the degree of bonding is controlling. It has been found and forms a central feature of this invention that the degree of bonding is determined by compacting techniques. Thus, compacting should be accomplished at relatively high temperatures, but at substantially less than melting point for good tortional stiffness.

Careful attention to the temperature conditions at the surface of the mat during the compacting is exceedingly important. It has now been found that in earlier experiments the temperature was not measured accurately. The source of the error was in the measurement of the temperature in the heating block which block was about 20° cooler than the actual temperature being applied to the mat.

Furthermore, even now, temperatures can only be measured reasonably accurately, i.e. about plus or minus 5°F.

Therefore, it has been discovered and forms an important feature of this invention that a proper empirical technique should be used to ascertain the best temperature to be used for a given mat.

That technique comprises of selecting the highest temperature at which fusion does not occur, i.e. about 320°F., for polypropylene.

Separators are made at that temperature. If porosity is not adequate, then sample separators are made at progressively lower temperatures until the temperature is found for that batch of mats which will form separators fitting within the critical parameters discussed above.

Thus, of necessity, there is a "zeroing in" approach of finding the fusion temperature and progressively lowering the temperature below the fusion temperature in 2°, 3° or 5° increments until the best temperature in the range is found. Generally, that temperature will be about 300°F. for polypropylene. For other polymers and resins, greatly different temperatures will be needed.

Nevertheless, it is important and to be specifically noted, that, in general, the proper temperature for achieving the critical parameters of the battery separators of the invention will range quite considerably below the melting point of a particular polymer. As a rule of thumb, that point will be about 5° to 20°F., preferably to 15°F., above the softening point of the polymer and 5° to 50°, preferably 5° to 35°F., below the melting point.

BRIEF DESCRIPTION OF THE DRAWINGS

FIG. 1 is a schematic view of the overall melt-blowing process;

FIG. 3 is a cross-sectional view of the nozzle die; and

FIG. 4 is a view of the lay-down of melt-blown fibers on a pick-up device.

FIG. 1A is an illustration of a stiffness tester.

FIGS. 2A and 3A are illustrations of an abrasion resistance tester.

DESCRIPTION OF THE PREFERRED EMBODIMENT

Figure 2:
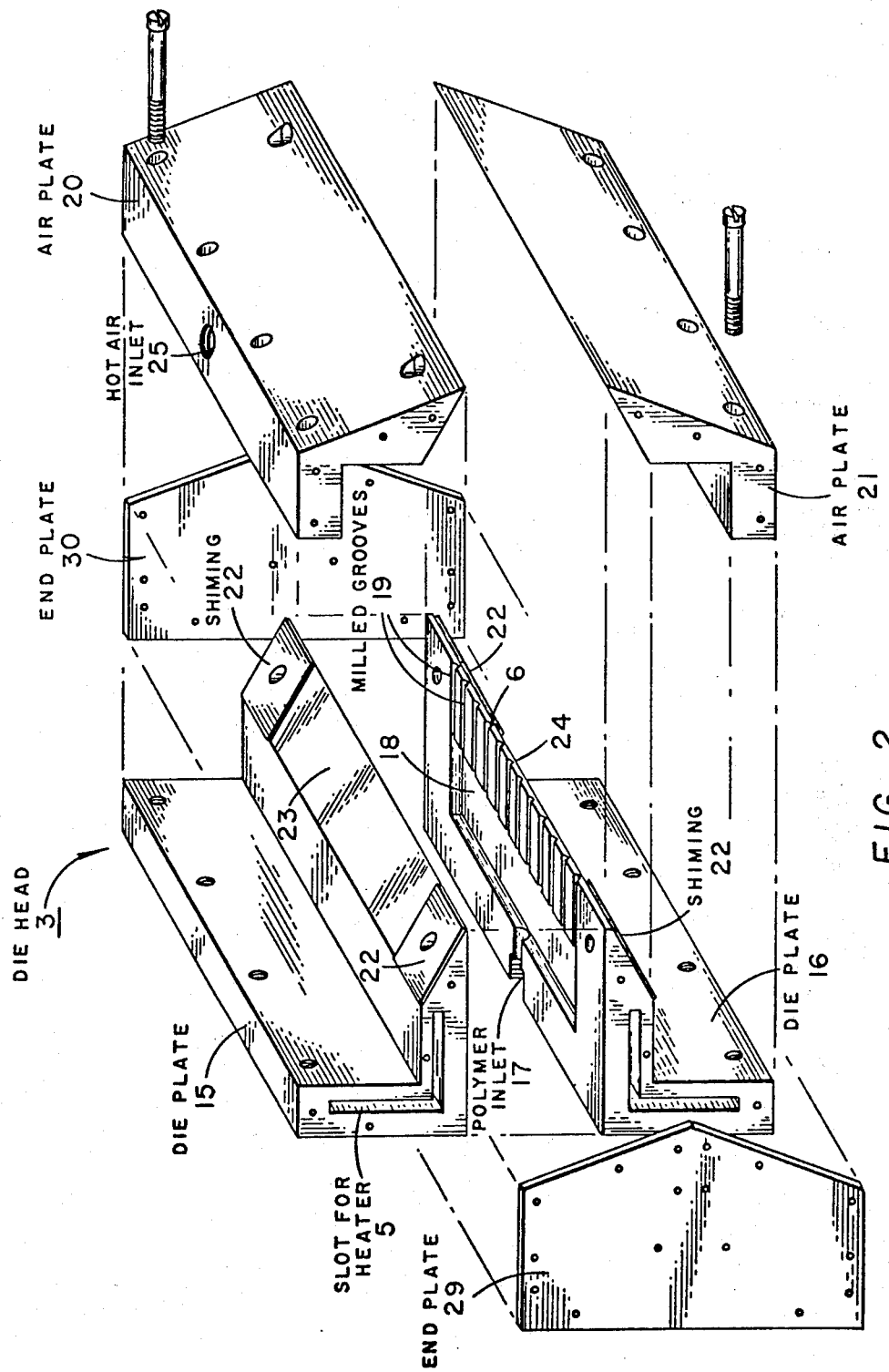
FIG. 2 is a detailed exploded oblique view of a nozzle die which may be used in the melt-blowing process.

Referring to FIG. 1 of the drawing, a fiber-forming thermoplastic polymer resin having an intrinsic viscosity of at least about 1.4, preferably a $C_3$ to $C_8$ polyolefin, e.g., polypropylene, is introduced into a pellet hopper 1 of an extruder 2. The resin used in the present invention has either been thermally degraded before being introduced into the extruder 2 or is thermally degraded in the extruder 2 and/or die head 3 with or without the use of free radical source compounds. According to the present invention, the resin is added into the hopper 1 and then is heated in the extruder 2 at temperatures in excess of about 550°F, and preferably within the range of 600° to 800°F. The degree of thermal degradation necessary varies since the viscosity average molecular weight of the resin will vary in conventional production of various resins having intrinsic viscosities of at least 1.4, and further since the degree of thermal degradation will depend on the resin flow rates used in the melt-blowing process. Particularly in the instances of polyolefins produced in a Zeigler catalyzed process, it has been Ziegler that a requisite degree of thermal degradation is necessary before it can be utilized in the melt-blown process of the present invention. The fiber-forming resin is forced through the extruder 2 by a drive 4 into the nozzle die head 3. The nozzle die head 3 may contain a heating plate 5 which may also be used in the thermal degradation of the resin before it is melt-blown. Thus, a partial thermal degradation of the resin may be carried out in extruder 2 and a final thermal degradation may be performed in the nozzle die head 3. The resin is then forced out of a row of nozzle orifices or die openings 6 in the nozzle die head 3 as molten strands into a gas stream which attenuates the molten strands into fibers 7 which are collected on a moving collecting device 8 such as a drum 9 to form a continuous mat 10. The gas stream which attenuates the extruded molten resin is supplied through gas outlet slots 11 and 12, respectively. These gas slots 11 and 12 are supplied with a hot inert gas, preferably air, by gas lines 13 and 14, respectively. The term "inert" in respect to the hot gas is used to mean a gas which is no more reactive with the extruded molten resin at the gas temperatures described herein than air is at such temperatures. The examples disclosed herein use air as a gas.

The air temperatures may vary from 500° to 900°F. Generally the air temperatures are within the same temperature range as the nozzle die temperatures. Usually the air temperatures are slightly higher, about 50°F., than nozzle die temperatures.

The process may be further understood by considering the details of the nozzle die head 3 which is more fully set forth in FIGS. 2 and 3. The complement parts of the die head 3 are shown in FIG. 2 in the exploded view. The nozzle die head 3 is made up of upper die plate 15 and a lower die plate 16.

The fiber-forming resin, preferably polypropylene, is introduced into the back of the die plates 15 and 16 through an inlet 17. The resin then goes into a chamber 18 between the upper and lower die plates 15 and 16, respectively. The facing of the die plate 16 has milled grooves 19 which terminate in the nozzle die openings or orifices 6. It is understood, of course, that the milled grooves may be in the lower die plate 16, in the upper die plate 15, or grooves may be milled in both plates 15 and 16. Alternatively orifices may be drilled in a single plate. An upper gas cover plate 20 and a lower gas cover plate 21 are connected to the upper die plate and lower die plate 15 and 16, respectively. The hot gas is supplied by inlets 25 and upper air plate 20 and lower inlet 26 in lower gas plate 21. Suitable baffling means (not shown) may be provided in both the upper gas chamber 27 and lower gas chamber 28 to provide a uniform flow of gas through the gas slots 23 and 25, respectively. End plates 29 and 30 make up the remainder of the nozzle die head 3. As shown in FIG. 3, the rear portion of the die head 3 may contain heating means 5 for heating both the polymer and air in the nozzle die head 3.

In FIG. 4 the laydown of the attenuated fibers 7 on the drum 9 is shown in more detail. The fibers are blown from the nozzle die head 3 and are laid down on the screen covering drum 9 which preferably is positioned from 1 to 30 inches from the nozzle orifices 6 in the nozzle die head 3. Mats produced when the screen is at a distance of 1 ¼ to 2 inches differ in compactness and appearance from those produced at a distance of 5 to 8 inches or those collected at greater than 12 inches. Also illustrated in FIG. 4 is the production of shot 31 which may be produced in the mat 10. Shot is a mass or glob of polymer which appears to be the result of individual fibers breaking, such a fiber break illustrated at 32 which because of its attenuation is forced into the mat 10 as a glob with a diameter many times the average diameter of the fiber.

The production of shot is related to gas flow rates at any given resin flow rate for a degraded resin apparent viscosity. Also, in making a uniform web, it is desired to eliminate the formation of "rope". Rope occurs when the gas flow rates from the two slots 11 and 12 are out of adjustment such that the attenuated fibers come in contact one with the other and are not blown away from the nozzle die head as individual fibers but come in contact and are laid down as collected aggregates. Insufficient gas flow rates for the resin flow rate or having the gas flow rates from the upper or lower gas slots out of adjustment will produce rope in a nonwoven mat. Rope can also be formed at long nozzle die head-to-collecting device distances (2 to 3 feet) where the fibers are entangled due to the turbulence of the air jet. The presence of both rope and coarse shot will make a non-woven material unacceptable for many uses because of adverse effect on appearance and on strength properties.

As the gas flow rates for a fixed resin flow rate are increased sufficiently so that rope is not formed, mats are formed from essentially continuous fibers, and have essentially no coarse shot, i.e., less than about 1 weight percent shot. This occurs at gas flow rates in the range from about 2.5 to about 20 pounds per minute per square inch of total slot area. With increasing gas flow rates for the fixed polymer rate and apparent viscosity a maximum gas flow rate is exceeded and coarse shot is produced having diameters greater than 0.3 millimeter. As the gas flow rates increase even further, in the range of from more than 20 to about 100 pounds per minute per square inch of total slot area, the shot becomes smaller and often elongated and appears as very fine shot at high gas flow rates. Shot is coarse and unacceptable when the masses or globs of polymer are relatively large (greater than 0.3 millimeter in diameter) and can be seen with the eye or when the web is calendered as an imperfection or fused spot.

The level of thermal treatment appropriate to impart the requisite extent of thermal degradation to the feed resin, in the extruder 2 for a set nozzle die temperature and a set resin flow rate is readily determined. The nozzle die tip temperature is set in the range from about 500°F. to 900°F., preferably 500°F. to 750°F., and the resin flow rate is set from about 0.1 to about 5 grams per minute per nozzle orifice. Then the air flow is fixed at a rate which is in the range of from more than 20 to about 100 pounds per minute per square inch of the total air slot area (sonic velocity levels). The mat is observed as zones of the extruder are heated. At too low a temperature in the extruder 2 the mat contains many large blobs of polymer and/or coarse ropey material. As the temperature is increased, the apparent viscosity of the degraded resin drops below the maximum for the chosen flow rate and air flow rate and the mat becomes finer fibered, softer, and has less and smaller shot of diameter smaller than 0.3 millimeter. When the temperature is too high, the mat becomes extremely soft and fluffy, but the air blast from the die causes extreme fiber breakage and many short fibers to be blown from the mat into the air, away from the laydown zone. The mats produced in the appropriate thermal degradation range are very white, opaque, and soft. The fibers are between about 0.5 and 5 microns in diameter, usually between about 1.5 and 4 microns in diameter.

As an alternative procedure, the temperature of the extruder 2 can be fixed, and the appropriate extent of thermal degradation can be obtained by raising the nozzle die temperature until it is in the correct range to produce the fine fibers and acceptably small fine shot, without extreme fiber breakage.

The best conditions for a fine fibered, soft web are obtained at a thermal treating temperature which is just below the temperature where fine fibers escape from the laydown zone with the air stream. The best thermal treating temperature for obtaining the highest strength fibers is the lowest temperature at which the shot is unobjectionable. The exact treating temperatures required to obtain good fine fibered webs is dependent upon the starting resin and the rate of throughput of the resin in the extruder. For example, a 5 melt flow rate (2.23 intrinsic viscosity) resin may require temperatures in the range of 650°–700°F. while an 0.5 melt flow rate (3.49 intrinsic viscosity) resin may require temperatures of 700°–760°F. or higher. Thermal treatment of the resin, say to intrinsic viscosities of from about 1.30 to 1.25, prior to feeding the resin through the extruder 2 can lower the required temperatures in the extruder 2 and/or the nozzle die head 3.

Another indication that the thermal treatment is adequate is the resin pressure (resin pressure head in the nozzle orifices) for the resin flow rate in the nozzle die head 3. When the resin is correctly thermally treated in the extruder, the resin pressure lies in a small range independent of the melt flow rate or intrinsic viscosity of the starting resin or of the nozzle die temperature. In the terms of the particular geometry of the nozzle die holes 6, by measuring the pressure upstream of the nozzle die holes for the flow rate of the particular resin and by calculating the apparent viscosity of the degraded resin in the nozzle die holes 6 according to methods well known in polymer rheology (see, e.g., H. V. Boenig, *Polyolefins*, Polyolefins, p. 264 (1966) and *Chemical Engineering Handbook* (Perry ed. 1950), p. 375, thermal treatment produces an apparent viscosity in the nozzle die holes 6 of from about 50 to about 300 poise, preferably at least 100 poise, an especially preferred range being from about 100 to about 200 poise.

With the appropriate level of thermal treatment determined as described immediately above for particular starting resin and resin flow rate, the air flow rate is suitably decreased to the low air flow rate regime (from about 2.5 to about 20 pounds per minute per square inch of total air slot area) for the production of non-woven mats in the low air flow rate regime from the appropriately thermally degraded fiber-forming resin.

Non-woven mats produced in the low air flow rate regime consist essentially of continuous fibers whose morphology as seen by a polarizing microscope is non-oriented. If the fiber cools slowly, a large spherulitic structure can form and the fibers are stiff and brittle. With more rapid cooling, the fibers are non-spherulitic, flexible, and have a high elongation to break. The cooling rate increases with decreasing fiber size and increased die nozzle to collector distance. The table below shows upper limits of air flow rates for various polymer rates from about 0.1 to about 0.3 grams per minute per orifice for various nozzle die temperatures. As the gas (air) rate was increased, the fibers were observed with a stroboscopic light at about 600 cycles per minute to observe visually when breakage started. The maximum air flow rate just below the breakage point is recorded.

| Die Nozzle | 4-inch row of 80 resin extrusion orifices, each orifice .022 inch diameter, .050 inches between orifice centers. |
|---|---|
| Air Slots | 4 inches long above and below the row of nozzle orifices, the slot opening being varied as shown in the table. |
| Resin | Polypropylene, partially thermally degraded to a melt flow rate of 33 (1.55 intrinsic viscosity). |
| Extruder Temperature | Constant at 500°F. |

| Run | Nozzle Die Temp.°F. | Resin Flow Rate (gm/min/orifice) | Air Slot Height (inches) | Air Velocity (ft/sec) | Air Rate lb/min/in$^2$ of Total Slot Area |
|---|---|---|---|---|---|
| 1 | 582 | 0.089 | .012 | 293 | 4.5 |
| 2 | 579 | 0.091 | .020 | 256 | 3.95 |
| 3 | 572 | 0.114 | .0315 | 338 | 5.32 |
| 4 | 580 | 0.141 | .012 | 343 | 5.29 |
| 5 | 581 | 0.145 | .020 | 330 | 5.10 |
| 6 | 591 | 0.256 | .012 | 470 | 7.17 |
| 7 | 572 | 0.256 | .020 | 466 | 7.25 |
| 8 | 545 | 0.089 | .020 | 391 | 6.25 |
| 9 | 606 | 0.117 | .020 | 210 | 3.25 |

By comparing Runs 1 through 7, it is seen that at constant nozzle die temperature, the allowed air velocity increases as the polymer rate increases.

By comparing Runs 8 with 1 and 2, 3 with 9, and 7 with 6, it is seen that the allowable air velocity decreases as the nozzle die temperature increases.

Similar behavior is observed for all $C_3$–$C_8$ polyolefin resins having an intrinsic viscosity of at least 1.4 that are appropriately thermally degraded to intrinsic viscosities of from about 0.6 to less than 1.4 The air velocity which causes fiber breakage is well below the sonic velocity of air at the nozzle die tip temperatures. The maximum fiber velocity as calculated from the fiber diameter and resin flow rate is well below the air velocity. The products consist of continuous fibers whose diameters usually range from about 8 to 50, preferably 8–30 microns depending on the nozzle die temperature, air flow rates, resin flow rates, and degree of thermal degradation imparted to the resin. The nonwoven mat or web has a slightly harsh feel and individual fibers are readily seen with the eye or with a low-powered magnifier (7X). The webs, when collected 6 or more inches from the die, show low strength and high elongation.

It is therefore seen that for resin flow rates of from about 0.1 to about 5 grams per minute per orifice, the characteristics of the non-woven mat under appropriate thermal treatment conditions are largely determined by the gas (air) flow rates used in the melt-blowing process. When the air flow rates are generally low or subsonic (2.5 to 20 pounds per minute per square inch total gas slot area), the fibers in the non-woven mat are essentially continuous while at the high air flow rates or sonic velocities the fibers are non-continuous and in addition fine shot is produced.

Another factor determining the characteristics of the product mat is the distance of the take-up device from the openings 6 in the nozzle die head 3. When the collecting device is between 1 to 6 inches, there is considerable self-bonding of the fibers since they are still hot at the point of laydown so that they bond one to another upon contact. At distances of 6 inches there still occurs self-bonding, but the amount decreases with distance.

When the air flow rates are too low for a selected resin flow rate, large coarse fibers are formed. These fibers are generally entwined to form coarse, ropey bundles or rope in the mat resulting in a coarse, nonpliable, brittle mat structure. At low or moderate air flow rates appropriate for the selected resin flow rate, fine, continuous fibers (most preferably 8 to 30 microns in diameter) are produced and the mat is of a soft and pliable texture. The mats produced at these moderate air rates have a cardboard appearing rigidity when the fibers are collected at about 5 to 6 inches but have loose fiber whiskers on the more compact inner structure of the mat. If the fibers are collected nearer the die openings, the mats appear more rigid and with less loose fibers or whiskers. A fluffier mat is produced if the fibers are collected at over 5 to 6 inches.

At even higher air flow rates for the selected resin flow rates fiber breakage occurs resulting in large objectionable shot in the mat. This type of shot is intermittent and may be as large as 1 millimeter in diameter and gives a rough, sandpapery feel to the mat. Upon calendering the mat, this type of shot appears as large translucent areas in the mat giving a coarsely speckled appearance to the calendered mat.

At even higher air flow rates for the selected resin flow rate (in the range from about 20 to about 100 pounds per minute per square inch of total air slot area), essentially all non-continuous and very fine fibers are produced with the formation of a very fine uniform type of shot. This shot is less than 0.1 millimeter in diameter and is not noticeable to the touch nor visually, but is detected after calendering whereupon the mat appears as a very smooth white mat with a highly uniform fine grained texture due to the presence of the very fine particles of shot. The mat produced at these very high air rates and at long die-to-collector distances has a very soft and pliable texture which appears like cotton batting, due to the very fine fibers (less than 5 microns).

In the case of the preferred polypropylene polymer in the most preferred process for melt blowing the battery separator mat the fine fibers are obtained by thermally treating the resin at temperatures in excess of 600°F. and preferably within the range of 620° to 800°F., usually in the extruder feeding the die head and in the die head itself, or may be treated in a separate step prior to being introduced into the extruder. The polypropylene as it is extruded out of the die openings into the gas stream is attenuated into fine fibers which are collected on a moving collecting device such as a drum to form a non-woven mat for conversion into the battery separator.

The gas flow is controlled so that the fibers as they are attenuated do not come into contact one with the other which results in rope and fiber bundles. The gas flow may vary over a wide range. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is less than about 10 microns.

The fibers are most preferably collected as a self-supporting mat on a collecting device such as a rotating drum at distances of about 1 to 18 inches from the die openings. Preferably a mat of self-bonded fibers is collected at a distance between 3 to 8 inches. A self-bonded mat as used herein means that the mat is a coherent, integral structure capable of withstanding normal handling such as winding, unwinding, cutting, pressing, calendering, etc., without losing its essential mat-like character.

In most mats used in the present invention, some thermal bonding occurs, usually directly dependent on the distance from the die head that the mat was formed.

For compacting it is highly important that temperatures between 280° and 320°F. be used with polypropylene and with the relatively low pressures.

For polypropylene, preferably temperatures of 290° to 310°F. and most preferably 295° to 305°F. are used.

At low temperatures, for example, within the range of between 80° and 120°F. but at high pressure such as 2500 psi or greater, the compacted non-woven polypropylene mat has a high porosity but poor stiffness and abrasion resistance.

In general, when polystyrene battery separators are to be made, the compacting conditions are as previously described, but the temperatures will be from 175° to 195°F., preferably 185° to 190°F.

Since there are a great many variables and parameters that are interrelated and must mesh to make an acceptable polyolefin battery separator, these are summarized in Table A.

TABLE A

| Properties (Ranges) | NON-WOVEN POLYOLEFIN BATTERY SEPARATOR PROPERTIES | | |
|---|---|---|---|
| | General | Preferred | Most Preferred |
| A. Separators | | | |
| Basis Weight | 100 – 400 gms/m$^2$ | 150 – 350 gms/m$^2$ | 175 – 325 gms/m$^2$ |
| Thickness | 10 – 50 mls | 15 – 35 mls | 20 – 30 mls |
| Porosity (Percent Void Fraction) | 40 to 70 | 50 to 65 | 55 to 60 |
| Maximum Pore Size ($\mu$) | 5 – 25 | 5 – 20 | 7 – 20 |
| Electrical Resistance Ohm/in$^2$ | 0.040 | 0.025 | 0.020 |
| Fiber Size $\mu$ | 10 | 5 | 2 |
| Abrasion Resistance Number of Cycles | 50 – 800 | 80 – 600 | 80 – 500 |
| Torsional Stiffness Grams-cm/degree | 0.25 to 1.5 | 0.3 to 1.0 | 0.5 to 0.9 |
| Solid Fraction | 0.3 to 0.6 | 0.35 to 0.5 | 0.4 to 0.45 |
| B. Process Conditions* | | | |
| Compacting Temperature of ± 5°F. | 280 to 320 | 290 to 310 | 295 to 305 |
| Compacting Pressures | about | | |

TABLE A-continued

NON-WOVEN POLYOLEFIN BATTERY SEPARATOR PROPERTIES

| Properties (Ranges) | General | Preferred | Most Preferred |
|---|---|---|---|
| psi | 1 to 10 | 2 to 8 | 4 to 7 |
| Compacting Time, seconds** | 1 to 60 | 5 to 40 | 5 to 30 |

*For polypropylene.
**The time is about 0.01 to 4, preferably 0.05 to 3, most preferably 0.5 to 1.5, seconds for calendering. Otherwise, except as described, the conditions are approximately the same. Therefore, the time range to include both calendering and flat pressing would be 0.01 to 60, preferably 0.05 to 40, and most preferably 0.5 to 30 seconds.

Various tests are used to ascertain the essential characteristics of the battery separator. A discussion of some of these is as follows:

Basis Weight

Here ten separators are weighed and the total weight ($W_{10}$) taken. The average height and thickness are also determined. These are then used in the formula as follows:

$$BW = \frac{155 \times W_{10}}{(h)(w)}$$

where
$h$ = height
$w$ = width and $W_{10}$ = weight (total);
$BW$ = basis weight
Solid fraction (SF) is calculated as follows:

$$SF = \frac{\text{Basis Weight}}{C(t)}$$

where
$t$ = Average web thickness which is measured on the separators per se.
$C$ = A constant which is $23.1 \times 10^3$ for polystyrene and $26.9 \times 10^3$ for polystyrene.
Void fraction = 1 − (solid fraction).

Electrical resistance determinations are carried out according to "Test Procedure for Determination of Electrical Resistance of Battery Separators" issued by the Association of American Battery Manufacturers, Inc., 19 North Harrison St., East Orange, New Jersey.

Pore size determinations are carried out according to ASTM D-2499-66T entitled "Pore Size Characteristics of Membrane Filters for Use with Aerospace Fluids," or the ASTM-E-128-61 test previously mentioned.

Tortional stiffness measurements are carried out on a stiffness tester which is illustrated in FIG. 1A.

The procedure, in general, is to cut 20 strips from separators which have ribs thereon. Ten of the strips have 8 ribs perpendicular to their long axis. Ten other strips have one rib running the full longitudinal length. The strips are ¾ inches wide by 4½ inches long.

The gauging plunger is turned a quarter of a turn and the plunger is locked in extended position.

One end of the test strip is inserted in the sample support and the other end is inserted in the hinged sample support.

Then the gauging plunger is rotated until the roll pin drops into the recess on the guide bushing.

Then the dial retaining spring is depressed and the angular rotation produced by a 3.33-gram load is read.

The dial is then rotated back to the locked position; the string with the test weight is wrapped around the pulley in the opposite direction.

The dial retaining spring is then depressed and the angular rotation produced by a 3.33-gram test load is read.

The procedure is repeated for another 9 test strips.

Then the average degree of rotation for the sample in the two directions is calculated.

Finally, the average value of tortional rotation ($TS_{11}$) parallel to the ribs and the average value perpendicular to the ribs ($TS_1$) is calculated as $TS_{11} = 13.32/X_{11}$ and $TS_1 = 13.32/X_1$. These give stiffness determinations in two directions: one parallel to the ribs and the other perpendicular to the ribs. The average of the two is taken as the tortional stiffness.

As was the situation with tortional stiffness, abrasion resistance is determined in an apparatus (illustrated in FIG. 2A) which was also designed by Applicant and his fellow researchers, since devices available to the industry were not satisfactory.

In brief, the apparatus employs the principle of contacting the sample with an angled drill bit which simultaneously turns in a circular arc and rotates about its longitudinal axis. One turn and one rotation occur every second and are called a cycle. The sample is mounted in the sample pedestal and the flutes of the drill are angled or pivoted so that they ride directly on the sample. When the drill bit penetrates the sample battery separator, it will complete a circuit through the metallic components of the apparatus and the change in current will show on a voltmeter connected into the circuit. The time interval for each test is measured with a stopwatch.

The sample is mounted on a pedestal and secured by a binder clip. The pedestal has a hollow chamber beneath it so as to provide a receptacle for the penetrating drill bit. A No. 65 (0.035 inch) drill is used. The drill is held in a pin vise manufactured by the L. S. Sterrett Company. The motor is a Hurst Model CA 60 rpm electrical motor.

The actual testing is carried out by cutting four sample coupons from each battery separator and testing each coupon sample in a test sequence. The drive motor and a stopwatch are started simultaneously upon initiation of the test sequence. The stopwatch is stopped when the resistance on the meter has dropped to 0.

The motor speed is timed to be one revolution per second. Therefore, the time interval in seconds read off the stopwatch is taken as the number of cycles of abrasion that the sample survived before failure.

The same test is repeated on the other seven coupons. The only difference is that one of the drill flutes is used for the odd numbered coupons and the other drill flute is used for the even numbered coupons. The average of the eight sequences on the eight coupons is taken as being the abrasion resistance in cycles per second. FIG. 3A shows the abrasion apparatus in more detail.

The present invention will be further illustrated by the following specific examples which are given by way of illustration. In the examples, unless otherwise specified, the nozzle die used was a 4-inch row of 80 orifices for resin extrusion, each orifice having a 0.022 inch diameter and being 0.050 between centers. The air slots above and below the row of orifices had a nominal height of about 0.010 inch.

EXAMPLES 1–4

In these examples the conditions were as follows:

| | |
|---|---|
| Resin | 33.6 melt flow rate (1.54 intrinsic viscosity) Polypropylene |
| Extruder Temperature | 590°F. |
| Die Temperature | 530°–545°F. |
| Air Temperature | 510°–540°F. |
| Resin | 7.1 gms/min (0.089 gms/min/orifice) |
| Collector Distance | 8 inches |
| Collector, rpm | 0.9 |

Air rate was varied with the results shown in Table II.

The resin used in these examples was a blend of base resin polypropylene having a low melt index which was extruded at extruder temperatures about 620°F. to produce the 33.6 melt flow rate polypropylene. By thereby thermally treating the polypropylene before introducing it to the extruder feeding the die, lower extruder and die temperatures could be used in the melt-blowing.

TABLE II

EFFECT OF AIR RATE ON FIBER FORMATION

| Example No. | Air Rate lbs/min | lbs/min/in² slot | Mat Description |
|---|---|---|---|
| 1 | 0.289 | 3.62 | Coarse, brittle mat composed of large ropey fibers |
| 2 | 0.474 | 5.86 | Softer mat, finer fibers |
| 3 | 0.659 | 8.25 | Soft, pliable mat composed of fine, continuous fibers |
| 4 | 0.705 | 8.86 | Mat contains large "shot" particles. Mat rough and of poor appearance. |

These Examples demonstrate the importance of proper air flow rate in obtaining mats with desirable characteristics. The optimum air flow rate will, of course, vary depending on other conditions.

For example, with all conditions the same as in the above except at a resin flow rate which was 21.2 grams per minute (0.265 grams per minute per orifice), an air flow rate of 1.12 pounds per minute (14 pounds/min-/in² slot) gave the best mat as compared to an air rate of 0.659 pounds/min. (8.25 pounds/min/in² slot) in Example 3. At this higher polymer rate, the fiber sizes were larger but still a good, uniform shot-free soft mat was obtained.

Moreover in an example using a die temperature of 590°F. instead of 530°–545°F. of Example 3, an air rate of 0.59 pounds/min. (7.36 pounds/min/in² slot) produced the best mat. It is generally true that a higher die temperature requires lower air flow rates for high quality mats.

EXAMPLES 5–9

The following Examples illustrate the mats that can be produced at very high air rates, where the size of the shot formed is so small as to be undetectable. The conditions were as follows:

| | |
|---|---|
| Resin | 33.6 melt flow rate (1.54 intrinsic viscosity) polypropylene |
| Extruder Temperature | 590°F. |
| Die Temperature | 645°F. |
| Air Temperature | 580°F. |
| Resin Flow Rate | 18.7 gms/min. (0.234 gms/min./orifice) |
| Collector Distance | 8 inches |
| Collector, rpm | 1.33 |

Air rate was varied with the results shown in Table III.

TABLE III

MAT PRODUCTION AT VERY HIGH AIR RATE

| Example No. | Air Rate lbs/min | lbs/min/in² slot | Mat Description |
|---|---|---|---|
| 5 | 1.05 | 13.1 | Mat contains large shot, rough, poor appearance |
| 6 | 1.28 | 16.0 | Mat contains smaller shot, still poor |
| 7 | 1.51 | 18.85 | Still smaller shot, better appearance |
| 8 | 1.74 | 21.8 | Mat contains fine shot, good appearance |
| 9 | 2.09 | 26.1 | Very fine shot unnoticeable to the touch. Mat extremely soft and pliable. Excellent appearance |

EXAMPLES 10–13

The following Examples show that different base resins can be used for forming good quality mats by proper thermal treatment of the resin using elevated extruder and die temperatures prior to fiber formation. For Examples 10–12 the conditions were as follows:

| | |
|---|---|
| Resin | 0.6 melt flow rate (3.37 intrinsic viscosity) polypropylene |
| Air Temperature | 640°F. |
| Resin Flow Rate | 8.2 gms/min. |

-continued

Air Rate    (.102 gms/min./orifice)
            0.54 pounds/min.
            (6.75 pounds/min./in² slot)
Collector Distance   6 inches
Collector, rpm       1.0

For Example 13 the conditions were as follows:

Resin            3.0 melt flow rate (2.47
                 intrinsic viscosity)
                 polypropylene
Air Temperature  580°F.
Resin Flow Rate  7.2 gms/min.
                 (0.09 gms/min./orifice)
Air Rate         0.786 pounds/min.
                 (9.83 pounds/min./in² slot)
Collector Distance   7 inches
Collector, rpm       3.0

The extruder temperatures and die temperatures used are shown in Table IV.

TABLE IV
EFFECT OF THERMAL TREATMENT ON FIBER FORMATION

| Example No. | Extruder Temp. °F. | Die Temp. °F. | Mat Description |
|---|---|---|---|
| 10 | 660° | 650° | Very coarse mat, large ropey fibers |
| 11 | 670° | 650° | Good mat, fine fibers, no shot, soft and pliable |
| 12 | 680° | 650° | Appreciable shot in mat. |
| 13 | 600° | 740° | Soft, pliable, and shot-free mat. |

As seen in Example 10–12, the extruder temperature is critical, holding all other conditions the same, in thermally treating this low melt flow resin so as to produce soft, shot-free mats. However, Example 13 illustrates that a lower extruder temperature but higher die temperature was used to form a good quality mat.

Examples 14–19

In the foregoing examples, the variables in the process are illustrated and emphasized; however, the following examples are set forth to illustrate the variety of mats which may be produced. The mats may be made in a wide variation of thickness, degrees of rigidity and general appearance. All the mats of the present invention have sufficient thickness, rigidity and strength to be self-supporting such that it may be removed from the takeup device as a self-bonded mat.

Mats may be produced which are tissue paper thin (0.0005–0.003inch) and would drape over a pencil in the same manner. Thicker mats (0.05–0.5inch) while still soft and pliable may have a more rigid appearance, e.g. that of thin cardboard. The thickness of the mat may be increased by slowing down the rate of removal of the mat from the take-up device or by multiple layers. The rate of removal may be controlled by the rpm of the drum while the multiple layers may be accomplished by multiple rotations of the drum or by using multiple die heads.

At the lower air rates, the mats have a more compact appearing core with loose, whisker-like fibers on either side of the more compact fibers. The compactness of the fibers in the mat is controlled largely by the distance of the take-up device from the die openings. At the high air rates, the mats have the appearance of cotton batting.

Exemplary mats are illustrated in the examples set forth in Table V which follows:

TABLE V

|  | 14 | 15 | 16 | 17 | 18 | 19 |
|---|---|---|---|---|---|---|
| Polypropylene MFR | 33.6 | 33.6 | 27.7 | 27.7 | 33.6 |  |
| Extruder Temp., °F. | 602 | 601 | 612 | 590 | 603 | 580 |
| Die Temp., °F. | 605 | 607 | 612 | 600 | 607 | 660 |
| Air Temp., °F. | 568 | 658 | 613 | 632 | 669 | 642 |
| Polymer Rate, gm/min. | 8.0 | 8.0 | 8.0 | 8.0 | 8.0 | 13.6 |
| Air Flow, lbs/min. | 0.569 | 2.33 | 0.513 | 1.75 | 2.33 | 2.77 |
| Screen Distance, in. | 6 | 6 | 6 | 5 | 6 | 1⅛ |
| Speed, rpm | 0.12 | 0.12 | 3.7 | 3.7 | 1 | 7.3 |
| Rotations | 1 | 1 | 1 | 1 | 9 | 1 |
| Mat Characteristics |  |  |  |  |  |  |
| Fiber Size | 15–25µ | ~2µ | 8–12µ | ~2µ | ~2µ | ~2µ |
| Thickness | 0.09" | 0.3" |  |  |  |  |
| Basis wt. gm/m² | 425 | 425 | 16 | 16 | 450 | 52 |

The mat from Example 14 was soft and pliable with a compact core and loose fibers on each surface. The mat had a rigidity or stiffness like thin cardboard. In contrast, the mat from Example 15 was produced at high air rates, the other conditions being very similar and was very soft, having the appearance of compacted cotton batting. The mat, due to its thickness, was fairly rigid.

The mat from Example 16 was approximately 0.0025 inches thick as taken from the pick-up device and when calendered had a translucent, slightly mottled, tissue paper appearance. The calendered mat was about 0.0009 inches thick. The mat from Example 17 was approximately 0.0028 inches before calendering. The calendered mat had a very fine grain, uniform, tissue paper appearance.

The mat from Example 18 illustrates that multiple layers of fibers may be melt blown to produce thicker mats. On the other hand, paper-like mats can be produced at very close distances from the die openings such as illustrated in Example 19.

EXAMPLES 20 and 21

For some applications it may be desirable to use other polyolefins than polypropylene in the form of fine fiber mats. For example, polybutene-1 can give a much lower stiffness to the mat; poly-3-methylbutene-1, poly-4-methylpentene-1, poly-4-methylhexane-1 and poly-5-methylhexene-1 have much higher melting points than polypropylene.

It has been found that $C_3$ or greater polyolefins having an intrinsic viscosity of at least about 1.5 can be melt-blown by the process of the present invention to produce good mats provided the $C_3$ or greater polyolefins are appropriately thermally treated.

To illustrate another $C_3$ to $C_8$ polyolefin other than polypropylene, poly-4-methylpentene-1 was successfully melt blown to produce a fine fiber mat (0.5 to 5 micron diameter). The conditions used in the melt blowing and the fiber characteristics are set forth in Table VI hereinafter.

Table VI

|  | 20 | 21 |
|---|---|---|
| Poly-4-methylpentene-1 |  |  |
| Intrinsic Viscosity | 1.82 | 1.82 |
| Extruder |  |  |
| Temp., °F. | 620 | 650 |
| Die |  |  |
| Temp., °F. | 537 | 570 |
| Air |  |  |
| Temp., °F. | 575 | 575 |
| Polymer |  |  |
| Rate, gm/min. | 13.6 | 13.6 |
| Air |  |  |
| Flow, lbs/min. | 4.86 | 4.46 |
| Screen |  |  |
| Distance, in. | 6 | ½ |
| Mat |  |  |
| Characteristics |  |  |
| Fiber Size | 2μ | 2μ |
| Intrinsic Viscosity | 1.23 | 0.88 |

EXAMPLE 23–26

The extent of thermal treatment necessary to thermally degrade a feed polypropylene resin having a starting melt flow rate of 33.6 (intrinsic viscosity of 1.54) to be extruded at a rate of 0.22 grams per minute per orifice from an extruder at a die temperature of about 600°–610°F. was determined by fixing the polymer flow rate and the nozzle die temperature and then increasing the extruder temperature until large shot (greater than 0.1 millimeters) was no longer produced yet short of causing fiber breakage. The data in Table VII were taken:

TABLE VII

| Example | 23 | 24 | 25 | 26 |
|---|---|---|---|---|
| Maximum Extruder Temp. °F. | 701 | 710 | 722 | 732 |
| Die Temperature, °F. | 610 | 601 | 601 | 602 |
| Air Temperature, °F. | 625 | 626 | 620 | 615 |
| Air Flow Rate, pounds/min./in² slot | 72.5 | 72.0 | 72.5 | 72.5 |
| Resin Flow Rate gm/min./hole | 0.22 | 0.22 | 0.22 | 0.22 |
| Melt Pressure, psig | 643 | 525 | 355 | 255 |
| Calculated $\mu_A$, poise | 115 | 94.1 | 63.6 | 45.7 |
| Web Properties | shot | Still some shot | Fairly nice web | Fibers breaking |

The above data was taken using a 4-inch wide nozzle die head containing a row of 80 triangular shaped orifices which were 0.015 inch in height and 0.75 inch long, with air slots of 0.015 inch in height on each side of the nozzle orifices. The apparent viscosity existing in the nozzle orifices at a particular extruder temperature was calculated according to the following equation:

$$\mu_A = \frac{\mu D^4 \rho g_c \Delta P}{128 LW}$$

where $\mu_A$ = apparent viscosity
$D$ = hole diameter (for non-circular holes = $4A/P$ where $A$ = area of opening $P$ = wetted perimeter)
$\rho$ = melt density
$gc$ = 32.2 lb ft/sec²/lb force
$\Delta P$ = pressure drop through hole
$L$ = length of holes
$W$ = rate of melt flow through hole From the foregoing measured and calculated data, it is seen that a given resin flow rate, air flow rate, and nozzle die temperature, the extent of thermal treatment is very critical in order to produce an appropriate level of thermal degradation and appropriate viscosity in the nozzle die holes. Thus, for the die hole configurations used in Examples 23–26 and at the polymer flow rate, air flow rate, and nozzle die temperature there employed, an extruder maximum temperature of 710°F. was ineffective to reduce the viscosity in the die holes to a level preventing the formation of coarse shot, but at an extruder maximum temperature of 732°F., the viscosity in the die holes had dropped below 50 poise and the fibers produced were so weak that they could not be formed into a satisfactory web. However, a shot free web of fine fibers was produced at an extruder maximum temperature of 722°F., which produced an apparent viscosity in the nozzle die hose of 63.6 poise.

The particular extent of thermal treatment necessary to degrade a feed resin to the proper intrinsic and apparent viscosity for extrusion at a particular resin flow rate and die temperature will vary with the changes in the die configuration, starting resin intrinsic viscosity, or resin flow rate. The necessary air rate will vary with the acceptable apparent viscosity in the nozzle die orifices. This is illustrated in the following Examples 27–31.

Examples 27–31.

In these examples, a 10-inch die with a row of 200 triangular shaped orifices having a height of 0.15 inch was employed. In Examples 28–31, the length of the orifices was 0.113 inch, whereas in Example 27, the length of the orifices was 0.375 inch. The intrinsic viscosity of the feed resin (polypropylene) was 1.54 in Examples 27, 28 and 30, was 2.47 in Example 29, and was 1.5 in Example 31.

The process conditions utilized in Examples 27–31 and the results thereby obtained are set out below in Table VIII.

TABLE VIII

| Example | 27 | 28 | 29 | 30 | 31 |
|---|---|---|---|---|---|
| Maximum Extruder Temp., °F. | 638 | 639 | 770 | 650 | 720 |
| Air Temperature, °F. | 631 | 630 | 660 | 700 | 707 |
| Die Tip Temperature, °F. | 615 | 597 | 625 | 610 | 640 |
| Air Flow Rate, pounds/min/in² slot | 76 | 33.5 | 35 | 82 | 46 |
| Polymer Resin Flow Rate gm/min/orifice | 0.5 | 0.5 | 0.6 | 1.0 | 1.9 |
| Melt Pressure, psig | 275 | 175 | 170 | 290 | 260 |
| Calculated, $\mu$, poise | 93 | 190 | 156 | 162 | 75 |

The higher die tip temperature of Example 27 compared to Example 28 produced a lower apparent viscosity of the resin in the orifice. In Example 27 the apparent viscosity was 93 poise, whereas the apparent viscosity in the nozzle orifice in Example 28 was 190 poise.

Comparison of Example 30 with Example 28 discloses that a greater overall extent of thermal treatment and higher air temperature was necessary for a doubled flow rate of the same starting resin to produce a satisfactory level of thermal degradation.

Similarly, a greater degree of thermal degradation, i.e. higher extruder temperature, was necessary for the higher intrinsic viscosity starting resin of Example 29 in order to produce a satisfactory level of thermal degradation.

Example 32

Non-woven polypropylene mats were produced by the melt-blowing process under conditions summarized in Table B hereinafter.

TABLE B

| Mat Number | 1 | 2 | 3 | 4 |
|---|---|---|---|---|
| Resin | | 33.6 melt flow rate | | |
| Die Temp. °F. | 590 | 585 | 550 | 580 |
| Air Temp. °F. | 670 | 650 | 560 | 644 |
| Polymer Rate gm/min. | 7.1 | 7.1 | 6.2 | 7.9 |
| Air Rate lbs/min./inch | 0.33 | 0.33 | 1.07 | 1.265 |
| Collector distance in. | 4.5 | 4.5 | 4.0 | 6.0 |
| RPM | 30 | 20 | 34 | 1.0 |

Mats No.1 and No.2 were produced at low air rates and the fibers in the mats had varying diameter sizes from 12 to 45 microns, i.e. relatively coarse. The basis weight of mat No.1 was 300 grams per square meter, whereas that of mat No.2 was 200 grams per square meter.

Mats No.3 and No.4 were produced at high air rates, and the fibers in the mats were of a diameter of 2 microns or less, i.e. relatively fine diameter. The basis weight of mat No.3 was 300 grams per square meter. Three mats were produced under the conditions of mat No.4, and their basis weights were 270, 266, and 256 grams per square meter, respectively.

Example 33

The following example illustrates the compacting operation and shows that the mechanical and electrical properties of the non-woven polypropylene structures are highly dependent on the compacting conditions used. In Table C hereinafter the mechanical properties of the structures are set forth after compacting under various conditions. The electrical properties important to battery separators are set forth in Table D.

Table D also illustrates that important properties of non-woven polypropylene structures can be varied by changing the fiber size and/or bulk density (basis weight). Higher bulk densities will result in smaller pore size, which is desirable, but also lower porosities which are not desirable. And, therefore, the electrical resistance is affected adversely by being raised to an undesirably high figure.

TABLE C

| Separator | Mat No. | Compacting Conditions | Thickness mils | Mechanical Properties |
|---|---|---|---|---|
| 1 | 1 | Flat Press. Room Temp., 1700 psi | 31 | Fuzzy surface, delaminates on wetting, poor stiffness |
| 2 | 3 | Flat Press. Room Temp., 1700 psi | 24.1 | Fair surface, poor abrasion resistance |
| 3 | 1 | Flat Press. 150°F., 1700 psi | 17.2 | Slick surface, delaminates on wetting, poor abrasion resistance |
| 4 | 2 | Flat Press. 150°F., 1700 psi | 12.8 | Slick surface, poor abrasion resistance; very limp |
| 5 | 1 | Calendered, 1400 lb/pli Room Temp. | 21.0 | Fuzzy surface, delaminates on wetting |
| 6 | 1 | Calendered, 1400 lb/pli 150°F. | 19.8 | Slick surface, poor abrasion resistance; very limp |
| 7[1] | 4 | Flat press., 300°F. | 23.6 | Excellent |
| 8[1] | 4 | Flat press., 300°F. | 28.1 | Excellent |
| 9[1] | 4 | Flat press., 300°F. | 33.6 | Excellent |
| 10[1] | 1 | Flat press., 330°F. | 17.2 | Melted into impermeable film |

[1]These mats were prepared at pressures of less than 10 psi, i.e. at approximately 7 psi, with spacer shims set at approximately the thickness in mils indicated in the appropriate column.

It can be seen from the data above in Table C that the battery separators produced were of excellent quality when the temperature was about 300° F. and the pressures were less than 10 psi. When the temperatures exceeded about 315° or 320° F., i.e. 330° F. even at low pressures, the battery separator fused into an impermeable slab, which was useless as a battery separator.

Example 34

One of the characteristics of polypropylene is that it is not easily wettable by aqueous materials, even strongly acidic aqueous materials. Since it is important that battery separators be wetted, i.e. by the sulphuric acid in a battery, it has been found that one way of producing structures which are so wettable is to conduct a "wet-out" operation. This process generally consists of immersing the battery separators in a surfactant which is maintained at a temperature of between 160° F. and 210° F.

Suitable surfactant materials for wetting out the non-woven polypropylene structures are anionic surfactants, such as aliphatic sulfates, for example, sodium dioctylsulfosuccinate (commercially sold as Aerosol-OT) or non-ionic surfactants such as polyethenoxy compounds, for example, nonylphenoxy poly (ethleneoxy)ethanol (commercially sold as IGEPAL CO-730). The surfactants are used at a concentration of between about 0.01 and 0.5 weight percent, based on total weight of solution.

The separators of Example 2 were dipped in a heated solution of 0.25 weight percent IGEPAL CO-730 and heated to a temperature of 200° F. After immersion in the solution for about 5 minutes, they were removed and placed in a 35 to 40 weight percent acid solution to be completely wetted out, and the electrical resistance was then measured. The results are summarized below in Table D.

TABLE D

| Separator Number | Mat Number | Maximum Pore Size, Microns | Electrical Resistance ohm in² | Porosity Percent |
|---|---|---|---|---|
| 1 | 1 | 62 | 0.025 | 57 |
| 2 | 3 | 10 | 0.043 | 46 |
| 3 | 1 | 22 | 0.078 | 23 |
| 4 | 2 | 30 | 0.034 | 32 |
| 5 | 1 | 32 | 0.042 | 37 |
| 6 | 1 | 21 | 0.102 | 34 |
| 7 | 4 | 8 | 0.034 | 44 |
| 8 | 4 | 9.5 | 0.024 | 53 |
| 9 | 4 | 12 | 0.017 | 61 |

As illustrated for separators Nos. 7–9, the unique combinations of low pore size, low resistance, and high porosity can be obtained in the non-woven battery separators of this invention. Thus, the fibers are very fine and have a diameter less than 10 microns and preferably less than 5 microns.

Thus, it is apparent that a combination of interrelated properties has been melded together to produce polymer fiber battery separators possessing good to excellent properties in all the major categories.

In general, the mats made of the fibers in the range from 0.5 to 5 microns have greater strip tensile strength than the mats made from the fibers having 8 to 40 micron diameter fibers, such latter mats having generally greater tear resistances.

The wetting technique described in Ser. No. 163,207 entitled "Battery Separator Manufacturing Process" and Ser. No. 149,677 entitled "Rewettable Battery Separator", both of which are incorporated herein by reference, in their entirety can also be used, as can the embossing technique described therein. That embossing technique can also be used to produce fused ribs.

There are several possible modifications that might be made in the process under proper circumstances:

a. The Liquid Blowing Agent Concept

Although the disclosure, thus far, has indicated that the blowing agent is gaseous, particularly air, there are some situations in which it would be preferable that a liquid blowing agent be used. This could be water or an organic solvent. It would depend upon the particular polymers being processed and the particular effect desired from the use of the liquid. In those instances, the use of liquids would confer economic advantages as well as novel properties.

b. The Use of Thermoset Polymers

The melt-blown process, although normally thought of as being useful only for thermoplastic materials, can also be used for thermoset materials which are adapted to be processed in thermoplastic equipment. There are a considerable number of thermosets which can be injection molded and otherwise handled as a thermoplastic material. One class of these materials that is particularly useful are phenolics, since they are relatively inexpensive. Furthermore, non-woven mats made from phenolics would have great utility as a flame resistant material and would not be abrasive to the skin nor create fine particles which could be harmful upon breathing as for example would glass fibers.

c. Polymer Solutions and Emulsions

The technique of the melt-blowing process can also be utilized for producing fibers at relatively low temperatures. The melt-blowing process is usually thought of as being restricted to molten plastics. But it is possible to prepare solutions of polymers or emulsions containing polymers which can be handled at far lower temperatures and with much greater ease which when subjected to the fiber-forming forces at the ambient conditions prevailing will solidify and form fibers. The solvent or emulsifying carrier medium would be conveyed away by the action of the blowing agent. As pointed out above, this need not be air but could be gas, and in some situations might even be designed to interact with the particular solvent or carrier fluid to dispose of it more readily.

For instance, a solution of polyvinyl acetate could be melt-blown in order to produce polyvinyl alcohol fibers which upon exposure to air would solidify.

d. Synthetic Pulp

The fibers emanating and produced from the melt-blowing process are very fine and can be handled and treated as a synthetic pulp. The process can be adjusted to make these relatively short and they can be used in combination with conventional wood fibers and deposited from a water suspension or mingled with wooden or cellulose fibers in a conventional paper making process where they are laid down on screens simultaneously with wood pulp and the resulting product is a composite of cellulose and thermoplastic fibers.

e. Coating Fibers

It is possible to use the fluid, e.g. gaseous or liquid blowing agent, as a carrier medium to coat the fibers emanating from the melt-blown process with various materials. For instance, powder, pigments, dyes, surfactants, viscosity modifiers, adhesives and the like could all be applied to the surfaces of the fibers in this manner. Also the fluid stream could be used to mix other fibers and particulates with the fibers so they are collected together with the melt-blown fibers to form composites with improved and unusual properties.

f. Web Impregnation

The webs made from the melt-blowig process can be impregnated with resin-forming materials. The impregnating materials can be applied from solutions or from suspensions of film-forming compositions which are either preformed or in monomeric form where they can be polymerized in situ. The impregnating materials can include phenolics, melamines, epoxies, silicons, polyesters, acrylics, styrene, vinyl chloride and the like.

Where preformed polymeric solids are used, they will comprise about 35 to 80 percent of the impregnating solution.

A particular advantage of the non-wovens is that they can be used in environments where the water resistance of cellulose is inadequate and precludes their use.

Furthermore, the non-woven webs from the melt-blowing process can be used as reenforcing materials for applications which require conventional fibrous reenforcements.

There are several applications where the use of polymeric mats produced by the melt-blown process would make superior reinforcing materials because of 1) their inteaction with the particular polymer that is being enforced, 2) superior strength, and 3) superior water resistance. An example would be polyesters, phenolics, urea-melamine epoxy, phenolic unsaturated polyester resins and the like.

g. Other Features

Non-woven mats with little or no compaction made from ultra violet sensitive polymers, such as polypropylene, will eventually decompose and biodegrade upon exposure to the sun and elements. Since the fibers have so much more surface area than film, degradation can occur without the necessity for special photo-degradation agents.

Webs are considerably easier to handle than film. Furthermore, materials can be inserted or impregnated into the webs to produce special combinations of benefits.

Webs can also be maintained and made sterile so easily, e.g., boiling, ethylene oxide treatment, etc. The webs can be made to retain water, permit breathing, hold impregnants, permit desired penetration.

h. Membranes

The polyolefin non-woven mats made from the melt-blown process also have unique applicability as relatively large pore membranes.

They can be prepared carefully in the absence of surfactants and surface oxidation to have low water wettability. Therefore, they can be used as membranes to permit the ready passage of vapors or non-aqueous liquids, but will be a barrier to liquids.

Unusual separations can be affected with this novel membrane.

The nature and objects of the present invention having been described and illustrated and the best mode thereof now contemplated set forth, what we wish to claim as new and useful and secure by Letters Patent is:

1. In a process for producing a melt-blown non-woven mat battery separator wherein a fiber-forming thermoplastic polymer resin is extruded in molten form from orifices of a heated nozzle into a stream of hot inert gas which attenuates said molten resin into fibers that form a fiber stream, and said fibers are collected on a receiver in the path of said fiber stream to form the non-woven mat, the improvement of:
   a. producing said mat at high resin flow rates, which comprises extruding from said nozzle orifices, at a resin flow rate of at least about 0.1 grams per minute per orifice, a fiber-forming thermoplastic polymer resin degraded to have both an intrinsic viscosity of from about 0.6 to less than 1.4 and an apparent viscosity in said nozzle orifices of from about 50 to about 300 poise;
   b. collecting said fibers on said receiver in a basis weight of 100 – 400 grams/in.$^2$;
   c. compacting said fibers to a mat thickness of 10 to 50 mils and a porosity (percent void fraction) greater than 40 percent at a temperature about 5° to 20°F. above the softening point of said thermoplastic and 5° to 35°F below the melting point of said thermoplastics utilizing fixed spacers or shims at
      i. a pressure of about 1–10 psi, and
      ii. a time interval of from 0.01 to 30 seconds wherein said spacers or shims prevent large pressures from being applied directly to the mat surfaces, and
   d. producing a battery separator having an electrical resistance less than 0.040 ohms/in$^2$.

2. In the process of claim 1 wherein the resin flow rates are from 0.1 to 5 grams per minute per orifice.

3. In the process of claim 1 wherein said hot inert gas attenuates said molten resin into fibers having average diameters of less than 10 microns.

* * * * *